(12) United States Patent
Kommula et al.

(10) Patent No.: US 10,708,198 B1
(45) Date of Patent: Jul. 7, 2020

(54) METHODS AND APPARATUS TO REDUCE PACKET FLOODING AND DUPLICATE PACKETS IN A MULTI-FABRIC VIRTUAL NETWORK

(71) Applicant: VMware, Inc., Palo Alto, CA (US)

(72) Inventors: Raja Kommula, Cupertino, CA (US); Thayumanavan Sridhar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/255,583

(22) Filed: Jan. 23, 2019

(51) Int. Cl.
 *H04L 12/931* (2013.01)
 *H04J 3/06* (2006.01)
 *H04L 12/933* (2013.01)

(52) U.S. Cl.
 CPC ............ *H04L 49/50* (2013.01); *H04J 3/0697* (2013.01); *H04L 49/15* (2013.01)

(58) Field of Classification Search
 CPC ......... H04L 49/50; H04L 49/15; H04J 3/0697
 See application file for complete search history.

(56) References Cited

U.S. PATENT DOCUMENTS

| | | | |
|---|---|---|---|
| 8,204,061 B1 * | 6/2012 | Sane ..................... | H04L 49/557 370/256 |
| 10,659,391 B1 | 5/2020 | Kommula et al. | |
| 2012/0033672 A1 * | 2/2012 | Page ..................... | H04L 45/245 370/395.53 |
| 2013/0088971 A1 | 4/2013 | Anantharam et al. | |
| 2014/0003436 A1 | 1/2014 | Wang | |
| 2014/0105213 A1 | 4/2014 | A K et al. | |
| 2014/0196037 A1 | 7/2014 | Gopalan | |
| 2014/0250220 A1 | 9/2014 | Kapadia et al. | |
| 2015/0312134 A1 * | 10/2015 | Kapadia .................. | H04L 45/02 370/256 |
| 2016/0091685 A1 | 3/2016 | Raza et al. | |

(Continued)

FOREIGN PATENT DOCUMENTS

WO 2015069573 5/2015

OTHER PUBLICATIONS

Xiapu Luo et al., "Design and Implementation of TCP Data Probes for Reliable and Metric-Rich Network Path Monitoring," USENIX'09 Proceedings of the 2009 Conference on USENIX Annual Technical Conference, Jun. 2009, 5 pages.

(Continued)

*Primary Examiner* — Curtis A Alia
(74) *Attorney, Agent, or Firm* — Hanley, Flight & Zimmerman, LLC

(57) ABSTRACT

A synchronizer is to synchronize a first MAC address from a first MAC address table of a first TOR switch to a second MAC address table of a second TOR switch, the first MAC address corresponding to a host, the first NIC to form a first active link between the first host and the first TOR switch, and store a first switch descriptor in association with the first MAC address in the second MAC address table, the first switch descriptor indicative of the first TOR switch. A packet transmitter is to, for a first packet to be delivered to the first host, send the first packet from the second TOR switch to the first TOR switch, without sending the first packet from the second TOR switch to the first host, based on the first switch descriptor stored in association with the first MAC address in the second MAC address table.

22 Claims, 9 Drawing Sheets

(56) References Cited

U.S. PATENT DOCUMENTS

| | | | |
|---|---|---|---|
| 2017/0019328 A1 | 1/2017 | Moreno et al. | |
| 2017/0026461 A1* | 1/2017 | Boutros | H04L 67/101 |
| 2017/0085395 A1 | 3/2017 | Koponen et al. | |
| 2018/0176145 A1* | 6/2018 | Sharma | H04L 47/726 |
| 2019/0020555 A1 | 1/2019 | Tayal et al. | |
| 2019/0020575 A1 | 1/2019 | Manthiramoorthy et al. | |
| 2019/0028382 A1 | 1/2019 | Kommula et al. | |
| 2019/0230011 A1* | 7/2019 | Gandham | H04L 41/145 |
| 2019/0230035 A1* | 7/2019 | Rao | H04L 47/2483 |
| 2019/0280968 A1 | 9/2019 | Sreenivasagaperumal et al. | |
| 2020/0036632 A1 | 1/2020 | Kommula et al. | |

OTHER PUBLICATIONS

International Searching Authority, "International Search Report," dated Nov. 7, 2019 in connection with International Patent Application No. PCT/US2019/043114 (5 pages).

International Searching Authority, "Written Opinion," dated Nov. 7, 2019 in connection with International Patent Application No. PCT/US2019/043114 (7 pages).

Green, "LAG vs. LBT for vSwitch Uplinks in vSphere," Mar. 26, 2015, Virtualization & Cloud Review, retrieved on Oct. 29, 2019 [https://virtualizationreview.com/articles/2015/03/26/load-balancing-vsphere-vswitch-uplinks.aspx] (5 pages).

United States Patent and Trademark Office, "Notice of Allowance," dated Sep. 11, 2019 in connection with U.S. Appl. No. 16/044,296 (8 pages).

United States Patent and Trademark Office, "Notice of Allowance," dated Jan. 8, 2020 in connection with U.S. Appl. No. 16/255,580 (7 pages).

United States Patent and Trademark Office, "Supplemental Notice of Allowability," dated Feb. 11, 2020 in connection with U.S. Appl. No. 16/044,296 (2 pages).

United States Patent and Trademark Office, "Corrected Notice of Allowability," dated Apr. 9, 2020 in connnection with U.S. Appl. No. 16/255,580 (2 pages).

United States Patent and Trademark Office, "Supplemental Notice of Allowability," dated May 8, 2020 in connection with U.S. Appl. No. 16/044,296 (2 pages).

* cited by examiner

FLOODING IN A NETWORK EMPLOYING
HARDWARE-ASSISTED LOAD-BASED TEAMING (LBT)

DUPLICATE MULTI-DESTINATION PACKETS IN A NETWORK EMPLOYING
HARDWARE-ASSISTED LOAD-BASED TEAMING (LBT)

MEDIA ACCESS CONTROL (MAC) ADDRESS TABLES

MAC ADDRESS TABLE SYNCHRONIZATION FOR HARDWARE-ASSISTED LBT MODE

EXAMPLE REDUCTION OR ELIMINATION OF NETWORK FLOODING

EXAMPLE REDUCTION OR ELIMINATION OF
DUPLICATE MULTI-DESTINATION PACKETS

EXAMPLE REDUCTION OR ELIMINATION OF
DUPLICATE MULTI-DESTINATION PACKETS

US 10,708,198 B1

METHODS AND APPARATUS TO REDUCE PACKET FLOODING AND DUPLICATE PACKETS IN A MULTI-FABRIC VIRTUAL NETWORK

FIELD OF THE DISCLOSURE

The present disclosure relates generally to network-based computing and, more particularly, to methods and apparatus to reduce packet flooding and duplicate packets in a multi-fabric virtual network.

BACKGROUND

Virtualizing computer systems provides benefits such as the ability to execute multiple virtual computer systems on a single hardware computer, replicating computer systems, moving virtual computer systems among multiple hardware computers, and so forth. "Infrastructure as a Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and network resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many hardware processor units (e.g., servers). The hardware processor units may be installed in standardized frames, known as racks, which provide efficient use of floor space by allowing the hardware processor units to be stacked vertically. The racks may additionally include other components of a cloud computing environment such as storage devices, network devices (e.g., switches), etc.

Figure 1:
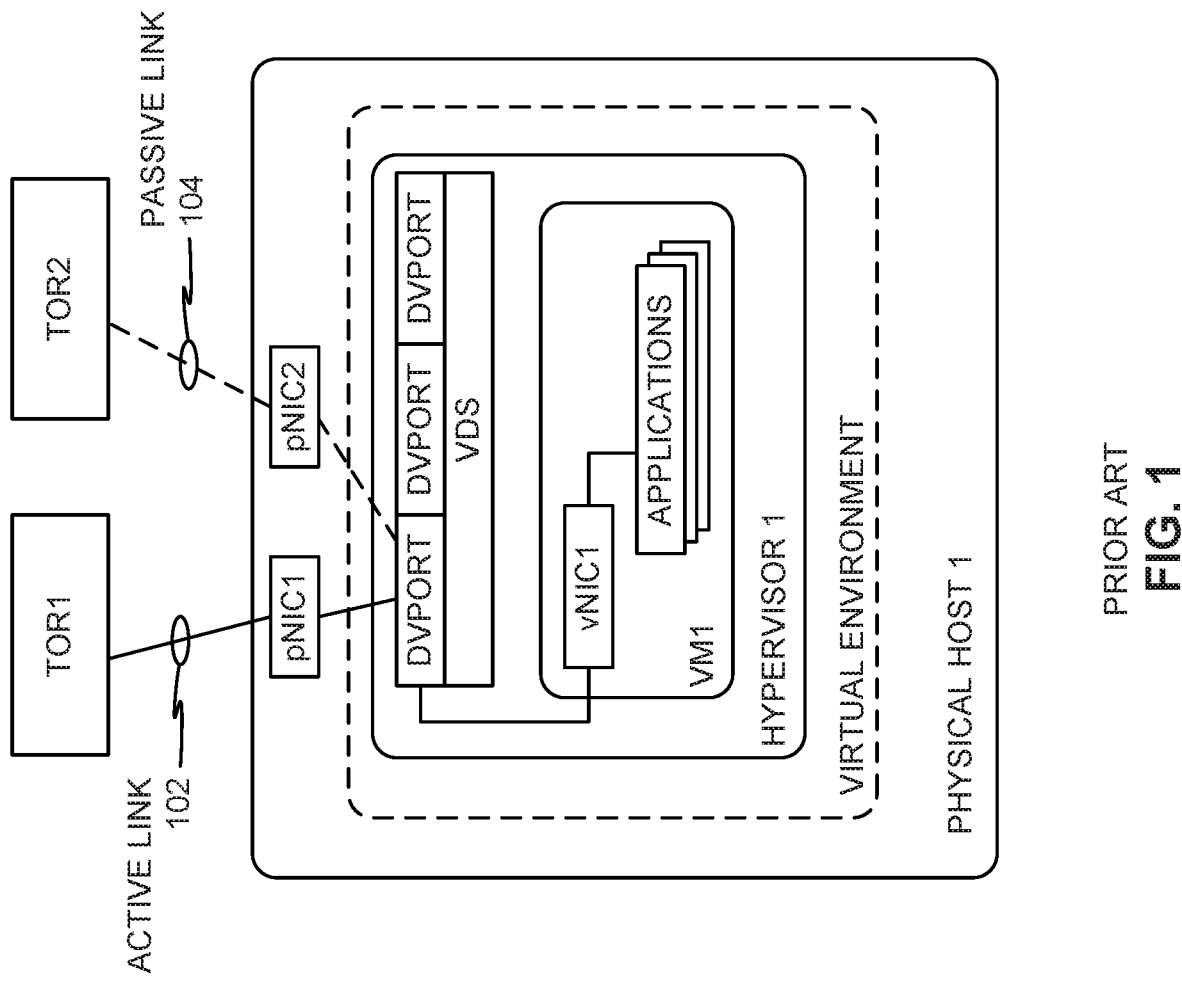
FIG. 1 is an example network topology in which a Load-Based Teaming (LBT) policy is used for load balancing across physical network interface cards (pNICs) that connect a physical host to two top-of-rack (TOR) switches in a physical server rack.

Wherever possible, the same reference numbers are used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Modern datacenters are equipped with physical racks in which multiple physical server hosts are installed. As used herein, the terms "server host" and "host" refer to a composition of physical hardware resources such as a physical server. The composition of physical hardware resources may be contained in a single physical unit or may be distributed across multiple physical locations and logically aggregated to form a "server host" or "host". A "server host" or "host" may be configured or allocated, partially or as a whole, to a virtual rack and/or workload; powered on or off in its entirety; and/or may otherwise be considered a complete functional unit. At the time of this writing, a physical server host ("host") typically includes up to four 10/25 gigabit-per-second (Gbps) physical network interface cards (pNICs) for high-availability purposes. These pNICs are typically connected to one or more switches called Top-of-Rack (TOR) switches of corresponding physical racks. In some instances, hosts in datacenters can be equipped with two or more pNICs, which are connected to multiple TOR switches for redundancy. This kind of connectivity provides a host with connectivity to other hosts via multiple network fabrics across the multiple TOR switches. For example, a first network fabric may connect a source host to a destination host via one or more switches using a first pNIC of the source host, and a second network fabric may connect the source host to the same destination host via another one or more switches using the same first pNIC or a second pNIC of the source host. As such, a network fabric enables communications between two hosts across a network via a network path that is different from another network of another network fabric between the same two hosts. The multiple network fabrics provide multiple ways to balance network traffic load(s) across multiple pNICs of a host. To implement a virtual network, a host includes a virtual network (vnetwork) distributed switch (VDS) in which multiple distributed virtual ports (dvports) can be instantiated to operate as virtual-to-physical network conduits between pNICs of the host and virtual network interface cards (vNICs) of virtual machines (VMs) running on the host so that network traffic of the VMs can flow between the virtual network to which the VMs are connected and a physical network through which the pNICs of the host connect to the TOR switches.

In physical rack architectures, a Load-Based Teaming (LBT) policy can be used to load balance network traffic across network links at the physical network layer, and a Link Aggregation Group (LAG) method can be used to aggregate physical network interface cards (pNICs) into link aggregation groups (LAGs) at the physical network layer. LBT, also known as "route based on physical NIC load," is a load balancing network protocol used to load balance network traffic across different pNICs based on link utilizations of active pNICs. When an application in a VM makes a request for a network connection to communicate over a network, a dvport is created and/or allocated to the requesting application and is bound to a pNIC. In this manner, the pNIC is the physical network resource that serves the dvport in the virtual network. In some examples, the dvport may be bound to multiple pNICs. However, the dvport is active on only one pNIC at a time (e.g., a dvport is not active across two pNICs at a same time). Making a dvport active on only one pNIC at a time is referred to as operating in Active-Passive mode.

An example active link and passive link configuration for a dvport is illustrated in FIG. 1, in which a solid line between a TOR1 switch and pNIC1 represents an active link 102 of an LBT configuration, and a dashed line between a TOR2 switch and pNIC2 represents a passive link 104 of the LBT configuration. Subsequent requests for network connections can result in additional dvports being created and bound to a pNIC on which one or more existing dvports are already active. (Two or more dvports may be active on the same pNIC at the same time.) When the utilization of the pNIC exceeds 75% of the total network traffic capacity of the pNIC, one or more dvports assigned to the pNIC is/are moved to a different, less utilized pNIC. Thus, employing LBT involves initially selecting only one pNIC for all outgoing traffic of a dvport, and multiple created/allocated dvports must share the single pNIC until the 75% utilization threshold is exceeded for that pNIC. Only after the 75% utilization threshold is exceeded for the pNIC does the LBT policy permit moving one or more dvports onto a less utilized pNIC so that none of the active pNICs exceeds the 75% utilization threshold. Another policy consideration when implementing LBT is that the active status of dvport on a pNIC is applicable only to outgoing (egress) traffic from the dvport to a TOR switch. That is, egress traffic is sent from the dvport only on the active pNIC link, while incoming (ingress) traffic from one or more TOR switches is accepted by the dvport from any active or passive pNIC link.

LAG methods can be implemented using a link aggregation control protocol (LACP) to bundle multiple pNICs together into a LAG. A dvport can be bound to the LAG (and, thus, to multiple pNICs), and it is presented as a single virtual network interface card (vNIC) available for use by applications executing in a VM. In such LAG methods, different pNICs of a LAG can be connected to separate physical network switches (e.g., TOR switches), and doing so enables creating high-available networks with redundant paths between any two hosts. Since multiple pNICs can be bundled together using LAG, a single dvport can achieve an effective throughput of all the pNICs' maximum capacities combined. Thus, a physical host server having four 10 Gbps pNICs can provide a single dvport with a maximum possible throughput of 40 Gbps bandwidth, if needed.

An LBT policy can be implemented in a virtual network to route packets based on virtual network routing procedures. To increase the speed of network routing, examples disclosed herein employ TOR switches to implement hardware-assisted LBT policies in which the TOR switches forward network packets in accordance with LBT policy at a physical network layer instead of using a virtual network layer to determine forwarding of the network packets. However, when forwarding at the physical network layer under prior LBT implementations, TOR switches do not distinguish between LBT active links and LBT passive links between hosts and the TOR switches. As such, performing hardware-assisted LBT packet forwarding using prior LBT techniques leads to network flooding and duplicate packet delivery at destination hosts. Examples disclosed herein determine when an LBT policy is enabled and enable TOR switches to implement hardware-assisted LBT packet forwarding while substantially reducing or eliminating network flooding and/or duplicate packet delivery by synchronizing MAC address tables between TOR switches and adding TOR switch descriptors to synchronized MAC address table entries identifying TOR switches in an LBT network configuration that are directly connected to hosts via LBT active links. In this manner, TOR switches can use the TOR switch descriptors in the synchronized MAC address table entries to identify routes containing LBT active links with hosts, and forward network packets at the physical network layer along paths with corresponding active links. By using TOR switch descriptors in the synchronized MAC address table entries to identify paths with corresponding LBT active links connected to destination hosts of network packets, TOR switches need not flood network packets onto all passive and active links to ensure successful packet delivery. Instead, TOR switches use selective network packet transmissions on select routes with LBT active links that correspond to destination hosts of those network packets. Refraining from also transmitting network packets along LBT passive links at the physical network layer substantially reduces or eliminates network flooding by those network packets. In addition, when transmitting BUM packets (e.g., broadcast type packets, unknown-unicast type packets, or multicast type packets), examples disclosed herein substantially reduce or eliminate duplicate packet delivery by preventing duplicate network packets from propagating toward the same destination host via both LBT active links and LBT passive links.

Forwarding packets at the physical network layer involves using MAC addresses of hosts stored in destination address fields of layer 2 (L2) headers of the packets. Layer 2 of the Open Systems Interconnection model (OSI model) is the data link layer that specifies how frames are transmitted between nodes on the physical layer (Layer 1). In accordance with L2 packet forwarding, a TOR switch retransmits a packet on any link that forms a path toward a destination node. Using examples disclosed herein, TOR switches use synchronized MAC address tables to identify LBT active links with hosts so that the TOR switches retransmit packets only on active links instead of retransmitting the packets on both active links and passive links. This substantially reduces or eliminates flooding a network with packets and/or duplicate packet delivery of BUM packets.

Figure 2:
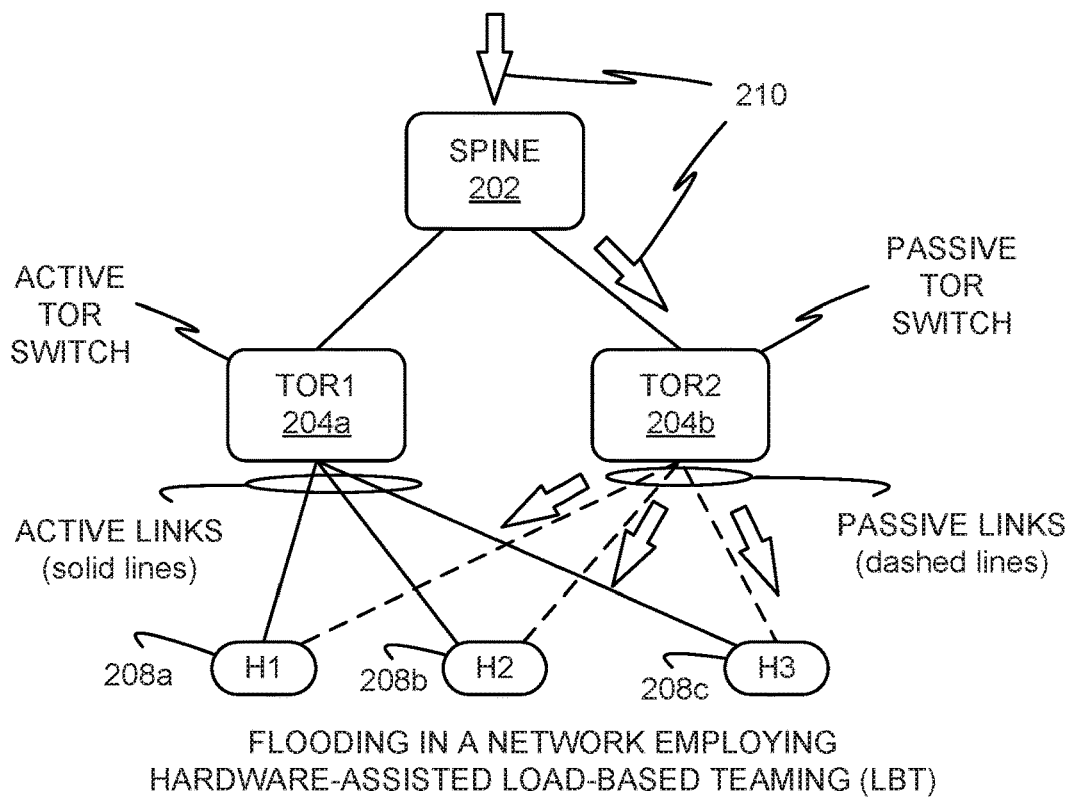
FIG. 2 illustrates how prior techniques for communicating network packets between a spine switch and TOR switches in a physical server rack result in network flooding when a hardware-assisted LBT policy is employed.

FIG. 2 illustrates how prior techniques for communicating network packets between a spine switch 202 and TOR switches 204a-b in a physical server rack result in network flooding when a hardware-assisted LBT policy is employed. FIG. 2 represents the physical server rack with three hosts shown as a first H1 208a, a second H2 208b, and a third host H3 208c connected to the first TOR switch (TOR1) 204a and the second TOR switch (TOR2) 204b, which are connected to the spine switch 202. In the example of FIG. 2, solid lines between TOR switches and hosts represent active links of an LBT configuration, and dashed lines between TOR switches and hosts represent passive links of the LBT configuration. If a network packet 210 destined for a VM on the first host H1 208a reaches the second TOR switch (TOR2) 204b (e.g., a passive TOR switch), which does not know where this VM is located, the second TOR switch (TOR2) 204b will flood the network packet 210 to every member port of an ingress virtual local area network (VLAN), which includes the first H1 208a, the second H2 208b, and the third host H3 208c. In a large network, on average, 50% of network traffic destined for the first host H1 208a enters the second TOR switch (TOR2) 204b. As such, 50% of the network traffic is flooded by the second TOR switch (TOR2) 204b to every host in the physical rack. This reduces the throughput of each pNIC, and also leaves hosts vulnerable to distributed denial of service (DDOS) attacks.

Figure 3:
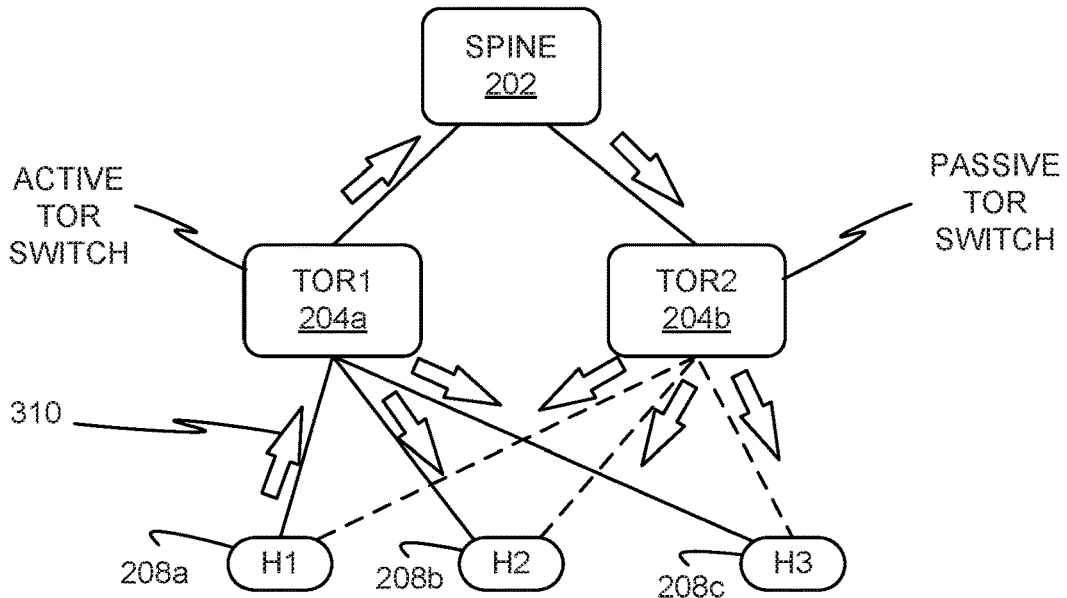
FIG. 3 illustrates how prior techniques for communicating multi-destination packets between a spine switch and TOR switches in a physical server rack result in duplicate packets when a hardware-assisted LBT policy is employed.

FIG. 3 illustrates how prior techniques for communicating multi-destination packets between the spine switch 202 and the TOR switches 204a-b in a physical server rack result in duplicate packets when a hardware-assisted LBT policy is employed. In this example, when using a hardware-assisted LBT policy, the first H1 208a, the second H2 208b, and the third host H3 208c may receive duplicate copies of multi-destination packets such as BUM packets, which can be broadcast type packets, unknown-unicast type packets, or multicast type packets. In FIG. 3, the second host H2 208b and the third host H3 208c receive two copies of a same BUM packet 310 sent by the first host H1 208a. This happens because the active TOR switch (shown as the first TOR switch (TOR1) 204a) floods the network, which includes the spine switch 202, with the BUM packet 310. In turn, the spine switch 202 forwards the BUM packet 310 to the inactive TOR switch (shown as the second TOR switch (TOR2) 204b) which lacks context information to know the location of the destination host node for the BUM packet 310. As such, the inactive TOR switch (the second TOR switch (TOR2) 204b) also floods the network with the BUM packet 310. As a result, both the second host H2 208b and the third host H3 208c receive duplicate copies of the same BUM packet 310 from both the first TOR switch (TOR1) 204a and the second TOR switch (TOR2) 204b.

Figure 4:
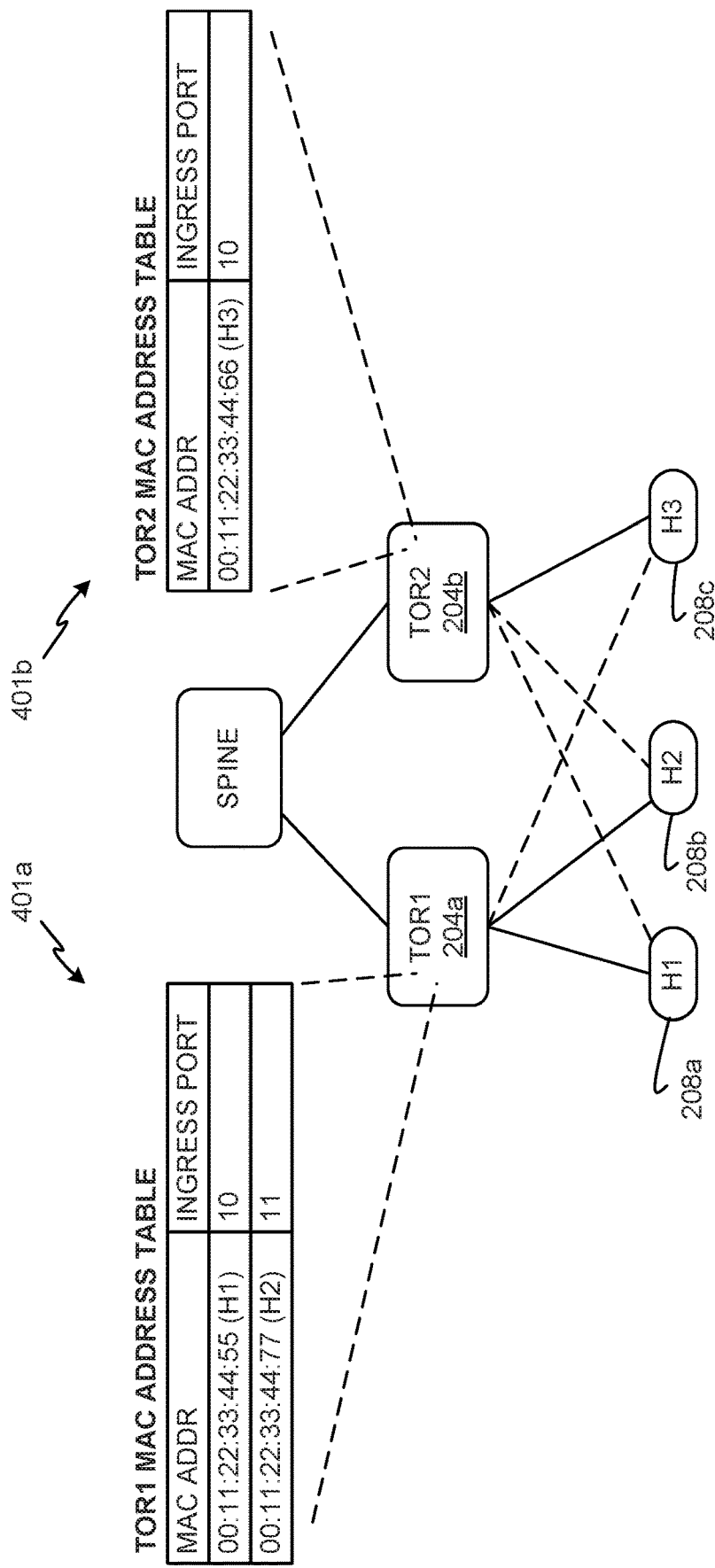
FIG. 4 illustrates prior structures of media access control (MAC) address tables in TOR switches.

FIG. 4 illustrates prior structures of MAC address tables 401a-b in the TOR switches 204a-b. The MAC address tables 401a-b of FIG. 4 are automatically learned by the TOR switches 204a-b based on network packets received on active links from the hosts 208a-c. For example, the MAC address tables 401a-b store MAC addresses of source hosts in association with ingress port numbers based on incoming network packets when they are received at the corresponding ingress ports of the TOR switches 204a-b from those source hosts. For each ingress port that receives ingress or inflow network packets at a TOR switch 204a-b, the TOR switch 204a-b includes a paired egress port to transmit egress or outflow network packets. The TOR switches 204a-b learn which of their ingress/egress ports are connected via active links to ones of the hosts 208a-c so that when the TOR switches 204a-b receive network packets destined to ones of the hosts 208a-c, the TOR switches 204a-b can use the MAC address tables 401a-b to identify port numbers connected to the hosts 208a-c. In this manner, the TOR switches 204a-b can use corresponding egress ports to transmit the network packets toward their final destinations.

In FIG. 4, the first TOR switch (TOR1) 204a is connected via active links (solid lines) to the first host H1 208a and the second host H2 208b, and the second TOR switch (TOR2) 204b is connected via an active link to the third host H3 208c. The first MAC address table 401a of the first TOR switch (TOR1) 204a stores MAC addresses of pNICs of the first host H1 208a and the second host H2 208b in association with corresponding ones of its ingress port numbers that are connected to those pNICs via LBT active links. The second MAC address table 401b of the second TOR switch (TOR2) 204b stores a MAC address of a pNIC of the third host H3 208c in association with a corresponding one of its ingress port numbers that is connected to that pNIC via an LBT active link. For instance, MAC address 00:11:22:33:44:55 corresponds to a pNIC of the first host H1 208a and is stored in the first MAC address table 401a in association with ingress port number 10 of the first TOR switch (TOR1) 204a, and MAC address 00:11:22:33:44:66 corresponds to a pNIC of the third host H3 208c and is stored in the second MAC address table 401b in association with ingress port number 10 of the second TOR switch (TOR2) 204b. Based on the mapped MAC address to ingress port number information, when the first TOR switch (TOR1) 204a receives a network packet destined for the MAC address 00:11:22:33:44:55 of the first host H1 208a, the first TOR switch (TOR1) 204a transmits the network packet via egress port number 10 which is paired to the mapped ingress port number 10 of the first MAC address table 401a. Similarly, when the second TOR switch (TOR2) 204b receives a network packet destined for the MAC address 00:11:22:33:44:66 of the third host H3 208c, the second TOR switch (TOR2) 204b transmits the network packet via egress port number 10 which is paired to the mapped ingress port number 10 of the second MAC address table 401b.

The first MAC address table 401a of FIG. 4 provides only active link context identifying ingress ports on which LBT active links are maintained by the first TOR switch (TOR1) 204a with the hosts 208a-b. Similarly, the second MAC address table 401b of FIG. 4 provides only active link context identifying an ingress port on which an LBT active link is maintained by the second TOR switch (TOR2) 204b with the third host H3 208c. As such, when either of the TOR switches 204a-b receives a network packet destined for one of the hosts 208a-c that is connected to that TOR switch 204a-b via a passive link, that TOR switch 204a-b is not aware of a particular network path along which to transmit the network packet. Under such circumstances, in forwarding network packets at the physical network layer, the TOR switch 204*a-b* transmits the network packet via all of its active and passive links in an attempt to ensure that the corresponding one of the destination hosts 208*a-c* will eventually receive the network packet. This results in the network flooding of FIG. 2. In addition, when either of the TOR switches 204*a-b* receives a BUM network packet, because the MAC address tables 401*a-b* only provide active link context for their corresponding ones of the TOR switches 204*a-b*, the TOR switches 204*a-b* broadcast the BUM network packet on all of their links regardless of active or passive link status in an attempt to ensure that all connected hosts 208*a-c* receive the BUM packet. This broadcast transmission strategy is used because a TOR switch forwarding packets at a physical network layer is not aware of whether another TOR switch maintains active links with hosts to successfully send the BUM packet to those hosts. As such, by sending the BUM packet on all active and passive links, a TOR switch increases the likelihood that all connected hosts will receive the BUM packet. However, having multiple TOR switches broadcast the same BUM packet to all hosts connected via passive and active links results in the duplicate packet delivery of FIG. 3.

Figure 5:
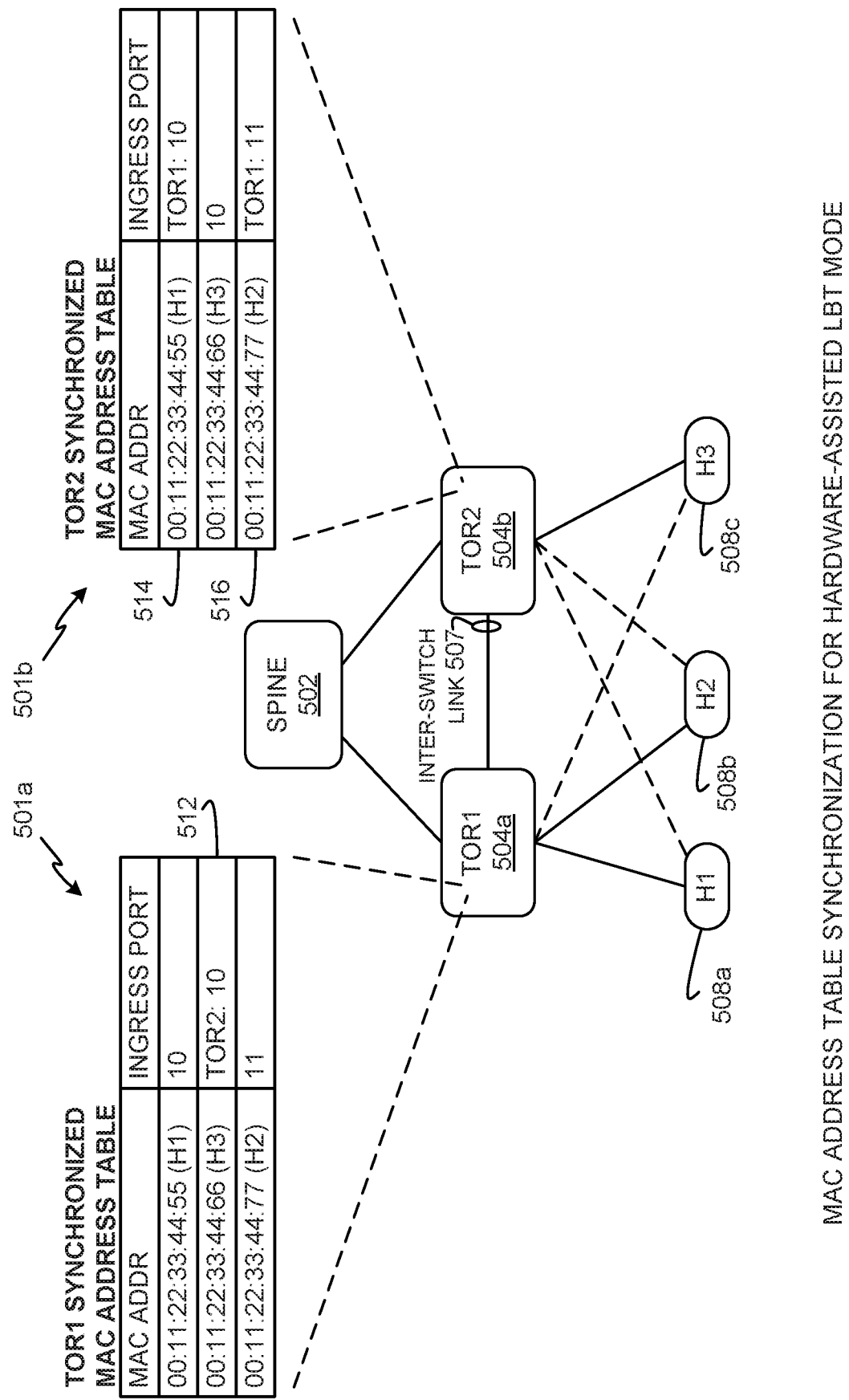
FIG. 5 depicts disclosed example structures for implementing synchronized MAC address tables in TOR switches using MAC address table synchronization in accordance with teachings of this disclosure when a hardware-assisted LBT policy is employed in an LBT network configuration.

FIG. 5 depicts disclosed example structures for implementing synchronized MAC address tables 501*a-b* in TOR switches 504*a-b* using MAC address table synchronization in accordance with teachings of this disclosure when a hardware-assisted LBT policy is employed for an LBT network configuration. The synchronized MAC address tables 501*a-b* provide inter-switch active link context by including active link information for both of the TOR switches 504*a-b*. That is, both of the TOR switches 504*a-b* are provided with their own active link context and active link context of one another. Providing such inter-switch active link context at the TOR switches 504*a-b* enables the TOR switches 504*a-b* to know when it is not necessary to transmit network packets on all of their active and passive links which substantially reduces or eliminates the network flooding of FIG. 2 and/or substantially reduces or eliminates the duplicate packet delivery of FIG. 3. An example use of the synchronized MAC address tables 501*a-b* of FIG. 5 to substantially reduce or eliminate network flooding is described below in connection with FIG. 6. Example uses of the synchronized MAC address tables 501*a-b* to substantially reduce or eliminate duplicate packet delivery are described below in connection with FIGS. 7 and 8.

In the example of FIG. 5, the TOR switches 504*a-b* are connected to ones of the hosts 508*a-c* via LBT active links and LBT passive links. For example, the first TOR switch (TOR1) 504*a* is an active TOR switch relative to the first host H1 508*a* and the second host H2 508*b*, and is a passive TOR switch relative to the third host H3 508*c*. Also in the example of FIG. 5, the second TOR switch (TOR2) 504*b* is a passive TOR switch relative to the first host H1 508*a* and the second host H2 508*b*, and is an active TOR switch relative to the third host H3 508*c*. That is, in the example of FIG. 5, the first TOR switch (TOR1) 504*a* is considered an active TOR switch relative to the first host H1 508*a* because it is connected to the first host H1 508*a* via an LBT active link (e.g., an LBT link that a host uses to transmit network packets via the TOR switch), and the second TOR switch (TOR2) 504*b* is a passive TOR switch relative to the first host H1 508*a* because it is connected to the first host 508*a* via an LBT passive link (e.g., an LBT link that a host does not use to transmit network packets via the TOR switch).

The first TOR switch (TOR1) 504*a* of FIG. 5 tracks the LBT active links with the first host H1 508*a* and the second host H2 508*b* by storing MAC address-to-port mappings in the first synchronized MAC address table 501*a*. A MAC address-to-port mapping in a synchronized MAC address table 501*a-b* representing an active link maintained by the same TOR switch that stores the mapping is referred to herein as an intra-switch active link mapping. For example, the first synchronized MAC address table 501*a* stores an intra-switch active link mapping of MAC address 00:11:22:33:44:55 of the first host H1 508*a* in association with ingress port number 10 of the first host H1 508*a* to reflect that the first TOR switch 504*a* maintains an LBT active link with the first host H1 508*a* via ingress port number 10 (and paired egress port number 10) of the first TOR switch 504*a*. The example first synchronized MAC address table 501*a* also stores an intra-switch active link mapping of MAC address 00:11:22:33:44:77 of the second host H2 508*b* in association with ingress port number 11 of the first TOR switch 504*a* to reflect that the first TOR switch 504*a* maintains an LBT active link with the second host H1 508*b* via ingress port number 11 (and paired egress port number 11) of the first TOR switch 504*a*. The second TOR switch (TOR2) 504*b* of the example of FIG. 5 tracks its LBT active link with the third host H3 508*c* by storing an intra-switch active link mapping in the second synchronized MAC address table 501*b*. For example, the second synchronized MAC address table 501*b* stores the intra-switch active link mapping of MAC address 00:11:22:33:44:66 of the third host H3 508*c* in association with ingress port number 10 of the third host H3 508*c* to reflect that the second TOR switch 504*b* maintains an LBT active link with the third host H3 508*c* via ingress port number 10 (and paired egress port number 10) of the second TOR switch (TOR2) 504*b*. These intra-switch active link mappings provide intra-switch active link context for the TOR switches 504*a-b*.

To provide inter-switch active link context, the synchronized MAC address tables 501*a-b* store MAC address-to-port mappings for LBT active links maintained by one another and tag those entries with the example switch descriptors indicative of corresponding ones of the TOR switches 504*a-b*. A MAC address-to-port mapping in a synchronized MAC address table 501*a-b* representing an active link maintained by a different TOR switch than the one storing the mapping is referred to herein as an inter-switch active link mapping. For example, the first synchronized MAC address table 501*a* stores an inter-switch active link mapping entry 512 of MAC address 00:11:22:33:44:66 of the third host H3 508*c* in association with ingress port number 10 of the second TOR switch 504*b* to reflect that the second TOR switch 504*b* maintains an LBT active link with the third host H3 508*c* via ingress port number 10 of the second TOR switch 504*b*. To indicate that the inter-switch active link mapping entry 512 stored in the first synchronized MAC address table 501*a* of the first TOR switch (TOR1) 504*a* corresponds to the second TOR switch (TOR2) 504*b*, the first TOR switch (TOR1) 504*a* stores a switch descriptor "TOR2" (identifying the second TOR switch (TOR2) 504*b*) in association with the inter-switch active link mapping entry 512. In the illustrated example of FIG. 5, the switch descriptor "TOR2" is shown prepended to the ingress port number 10. In other examples, the switch descriptor "TOR2" may be prepended or appended to either of the ingress port number or the MAC address. Alternatively, the switch descriptor "TOR2" may be stored in a separate column in association with the corresponding ingress port number or MAC address and/or may be stored using any other suitable arrangement. Although the labels "TOR1" and "TOR2" are used in examples disclosed herein to indicate ones of the TOR switches 504*a-b*, any other suitable labels (e.g., MAC addresses of the TOR switches 504a-b, numbers, symbols, letters, etc.) may be used as the descriptors.

The example second synchronized MAC address table 501b stores two inter-switch active link mapping entries indicated by reference numbers 514 and 516. The first inter-switch active link mapping entry 514 of the second synchronized MAC address table 501b stores MAC address 00:11:22:33:44:55 of the first host H1 508a in association with ingress port number 10 of the first TOR switch 504a to reflect that the first TOR switch 504a maintains an LBT active link with the first host H1 508a via ingress port number 10 (and paired egress port number 10) of the first TOR switch 504a. The second inter-switch active link mapping entry 516 of the second synchronized MAC address table 501b stores MAC address 00:11:22:33:44:77 of the second host H2 508b in association with ingress port number 11 of the first TOR switch 504a to reflect that the first TOR switch 504a maintains an LBT active link with the first host H1 508a via ingress port number 11 (and paired egress port number 11) of the first TOR switch 504a. To indicate that the inter-switch active link mappings 514 and 516 stored in the second synchronized MAC address table 501b of the second TOR switch (TOR2) 504b correspond to the first TOR switch (TOR1) 504a, the second TOR switch (TOR2) 504b stores a switch descriptor "TOR1" (identifying the first TOR switch (TOR1) 504a) in association with the inter-switch active link mappings 514 and 516.

To enable MAC address table synchronization for the synchronized MAC address tables 501a-b in TOR switches 504a-b, examples disclosed herein establish an inter-switch link 507 between the TOR switches 504a-b. The example TOR switches 504a-b use the inter-switch link 507 to synchronize mappings of MAC addresses to port numbers from their synchronized MAC address tables 501a-b with one another. In examples disclosed herein, the first synchronized MAC address table 501a is an internal MAC address table relative to the first TOR switch (TOR1) 504a and is an external MAC address table relative to the second TOR switch (TOR2) 504b. Similarly, the second synchronized MAC address table 501b is an internal MAC address table relative to the second TOR switch (TOR2) 504b and is an external MAC address table relative to the first TOR switch (TOR1) 504a.

The example TOR switches 504a-b also use the inter-switch link 507 to transmit network packets to one another. For example, when the second TOR switch 504b determines that it has received a network packet destined to any of the hosts 508a-c with which it does not maintain an active link, and the second TOR switch 504b uses the inter-switch active link context information in its synchronized MAC address table 501b to determine that the first TOR switch 504a maintains an active link with the destined one of the hosts 508a-c, the second TOR switch 504b transmits the network packet to the first TOR switch 504a via the inter-switch link 507.

Figure 6:
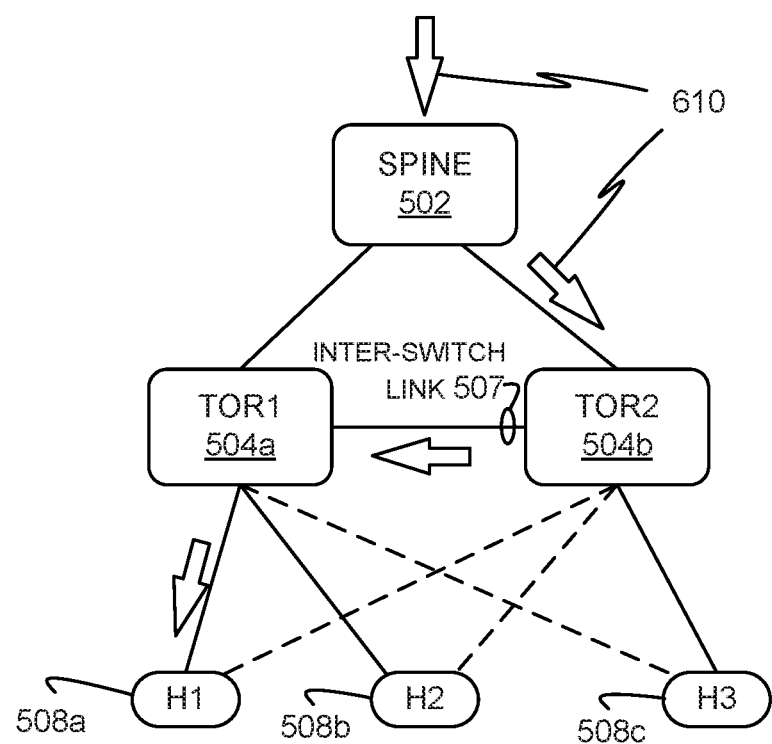
FIG. 6 depicts a disclosed example technique to substantially reduce or eliminate the network flooding of FIG. 2 in a multi-fabric virtual network when a hardware-assisted LBT policy is employed by using MAC address table synchronization and an inter-switch link between TOR switches.

FIG. 6 depicts a disclosed example technique to substantially reduce or eliminate the network flooding of FIG. 2 in a multi-fabric virtual network when a hardware-assisted LBT policy is employed by using the MAC table synchronization described above in connection with FIG. 5 and using the example inter-switch link 507 between the TOR switches 504a-b. In the example of FIG. 6, an example LBT network configuration implements a hardware-assisted LBT policy for network communications between an example spine switch 502 and the example TOR switches 504a-b in a physical server rack. As discussed above in connection with FIG. 5, MAC address table synchronization provides the TOR switches 504a-b in the LBT network configuration with awareness of inter-switch active link context.

As shown in FIG. 6, an example network packet 610 is received by the spine switch 502. The example network packet 610 includes a destination address corresponding to the first host H1 508a. The example spine switch 502 sends the network packet 610 to the second TOR switch 504b. In the illustrated example, the second TOR switch 504b is a passive TOR switch relative to the first host H1 508a. This is represented in the second synchronized MAC address table 501b of FIG. 5 because it does not store an intra-switch active link mapping entry corresponding to the first host H1 508a. Instead, the second synchronized MAC address table 501b stores the inter-switch active link mapping entry 514 showing that the first TOR switch (TOR1) 504a maintains an LBT active link with the first host H1 508a. As such, when the network packet 610 reaches the second TOR switch (TOR2) 504b of the LBT network configuration, the second TOR switch (TOR2) 504b sends the network packet 610 to the first TOR switch (TOR1) 504a of the LBT network configuration based on the inter-switch active link mapping entry 514 (FIG. 5) of the second synchronized MAC address table 501b indicating that the first TOR switch (TOR1) 504a is connected to the first host H1 508a via an active link. When the first TOR switch (TOR1) 504a receives the network packet 610 from the second TOR switch (TOR2) 504b, the first TOR switch (TOR1) 504a uses its synchronized MAC address table 501a (FIG. 5) to identify the port via which to send the network packet 610 to the first host H1 508a. For example, the first TOR switch (TOR1) 504a looks up looks up the destination MAC address of the network packet 610 in the first synchronized MAC address table 501a to determine that it should transmit the network packet 610 on egress port number 10 to reach the first host H1 508a.

Figure 7:
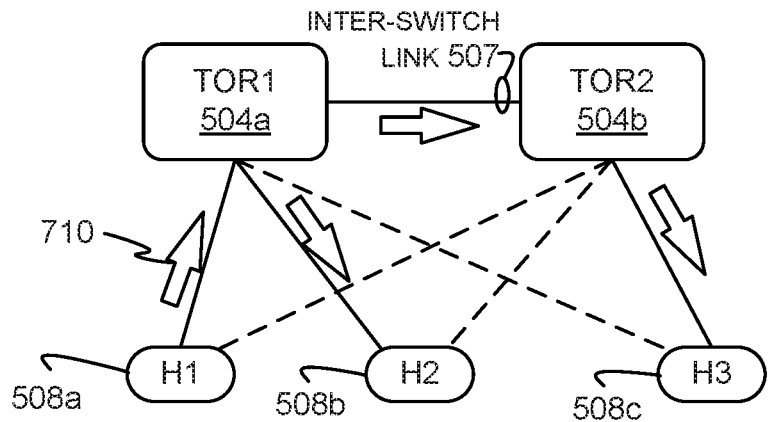
FIGS. 7 and 8 depict disclosed example techniques to substantially reduce or eliminate the duplicate multi-destination packet delivery of FIG. 3 in a multi-fabric virtual network when a hardware-assisted LBT policy is employed by using MAC address table synchronization and an inter-switch link between TOR switches.
Figure 8:
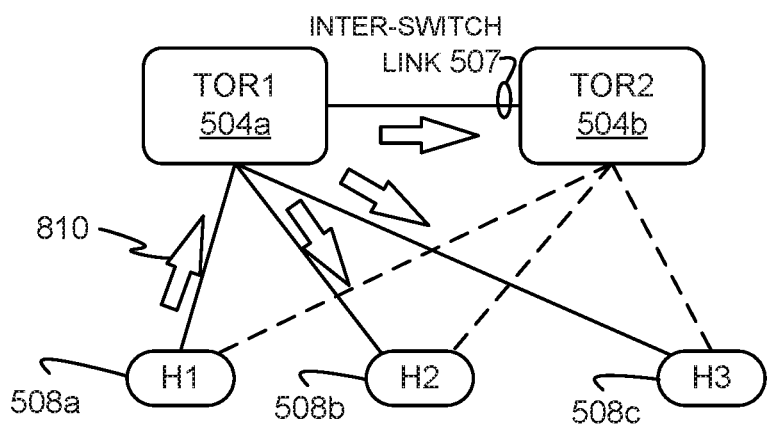

FIGS. 7 and 8 depict disclosed example techniques to substantially reduce or eliminate the duplicate multi-destination packet delivery of FIG. 3 in a multi-fabric virtual network when a hardware-assisted LBT policy is employed by using MAC address table synchronization and the inter-switch link 507 between the TOR switches 504a-b described above in connection with FIG. 5. The MAC address table synchronization and the inter-switch link 507 enable the TOR switches 504a-b to transmit BUM packets only on active links and neighboring TOR switches. By not also transmitting the BUM packets on passive links, hosts are less likely to receive duplicate BUM packets from the TOR switches 504a-b.

In the example of FIG. 7, when the first TOR switch (TOR1) 504a receives a BUM packet 710 from the first host H1 508a, the first TOR switch (TOR1) 504a checks its synchronized MAC address table 501a (FIG. 5) to determine ones of the hosts 508a-c with which it maintains active links. As such, the first TOR switch (TOR1) 504a finds an intra-switch active link mapping in the first synchronized MAC address table 501a showing that it maintains an active link with the second host H2 508b. Using this information, the first TOR switch (TOR1) 504 transmits the BUM packet 710 to the second host H2 508b as shown in FIG. 7. Also based on the intra-switch active link mappings and the inter-switch active link mappings in the first synchronized MAC address table 501a, the first TOR switch (TOR1) 504a does not send the BUM packet 710 to the third host H3 508c because the first synchronized MAC address table 501a does not store an intra-switch active link mapping corresponding to the third host H3 508c. Instead, the first TOR switch (TOR1) 504a sends the BUM packet 710 to the second TOR switch (TOR2) 504*b* via the inter-switch link 507. In some examples, TOR switches broadcast BUM packets to neighboring TOR switches so that those TOR switches can send the BUM packets along their active links with hosts. In addition, the inter-switch active link mapping entry 512 (FIG. 5) in the first synchronized MAC address table 501*a* provides the first TOR switch (TOR1) 504*a* with inter-switch active link context indicating that the second TOR switch (TOR2) 504*b* maintains an LBT active link with the third host H3 508*c*. As such, the first TOR switch (TOR1) 504*a* does not need to send the BUM packet 710 to the third host H3 508*c* because the second TOR switch (TOR2) 504*b* maintains an LBT active link via which the second TOR switch (TOR2) 504*b* can send the BUM packet 710 to the third host H3 508*c*.

Turning to FIG. 8, the illustrated example shows the first TOR switch (TOR1) 504*a* as an active switch and the second TOR switch (TOR2) 504*b* as a passive switch relative to the hosts 508*a-c*. In this example, a synchronized MAC address table of the first TOR switch (TOR1) 504*a* includes intra-switch active link mapping entries representing active links between the first TOR switch (TOR1) 504*a* and all of the hosts 508*a-c*. As such, when the first TOR switch (TOR1) 504*a* receives a BUM packet 810 from the first host H1 508*a*, the first TOR switch (TOR1) 504*a* transmits the BUM packet 810 to the second host H2 508*b* and the third host H3 508*c* based on corresponding ones of the intra-switch active link mapping entries in its synchronized MAC address table. In the example of FIG. 8, the first TOR switch (TOR1) 504*a* also transmits the BUM packet 810 to the second TOR switch (TOR2) 504*b* via the inter-switch link 507. However, the second TOR switch (TOR2) 504*b* does not transmit the BUM packet 810 to any of the hosts 508*a-c* because it is a passive TOR switch that does not store any intra-switch active link mappings indicative of active links between the second TOR switch (TOR) 504*b* and the hosts 508*a-c*.

Figure 9:
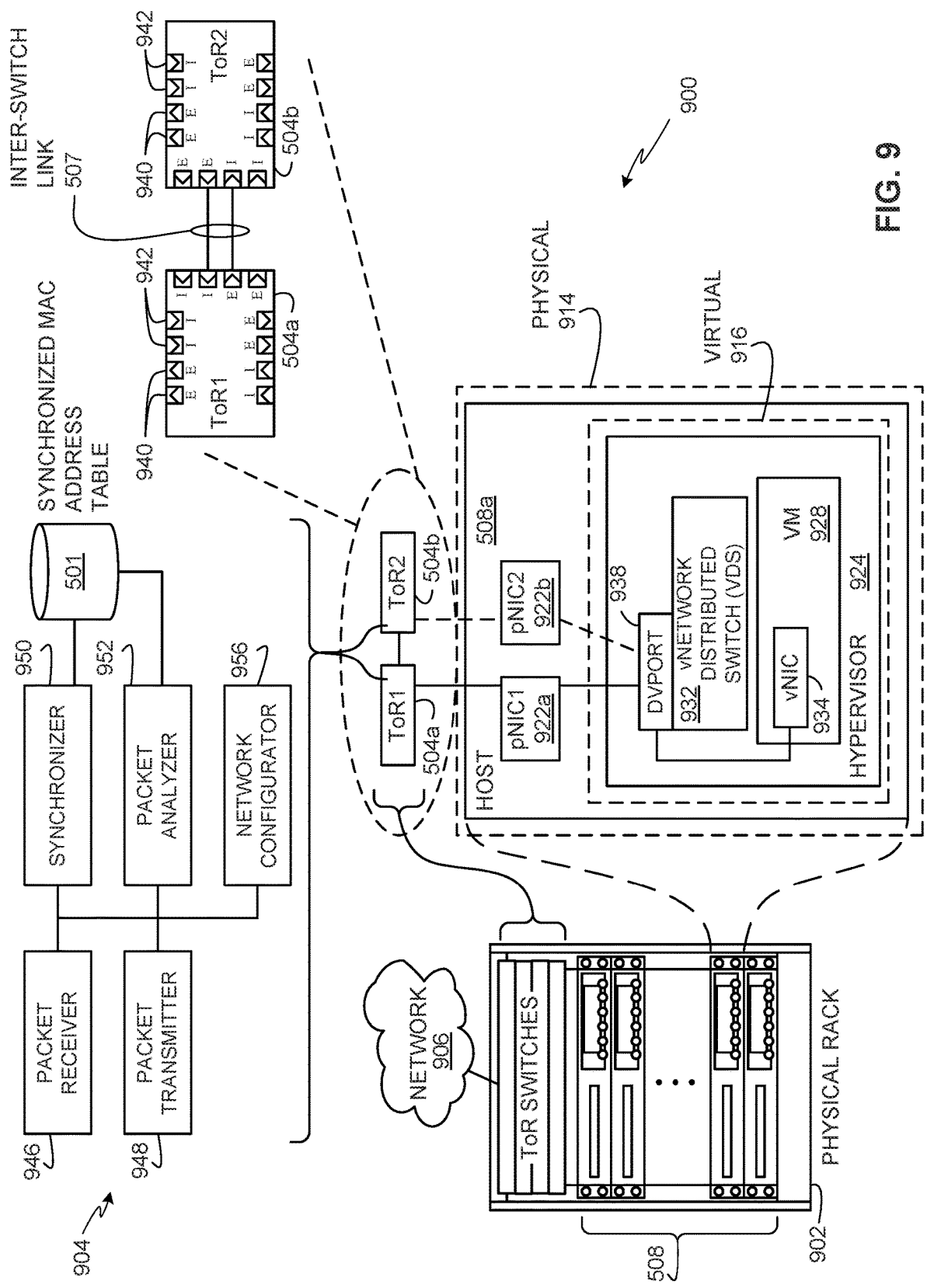
FIG. 9 is a block diagram of an example environment in which the TOR switches and hosts of FIGS. 5-8 are in a physical rack and the TOR switches include apparatus to implement teachings of this disclosure.

FIG. 9 is a block diagram of an example environment 900 in which the TOR switches 504*a-b* and hosts 508*a-c* of FIGS. 5-8 are in a physical rack 902. Also shown in FIG. 9 is an example apparatus 904 provided in both of the TOR switches 504*a-b* to implement teachings of this disclosure. For ease of illustration, only a single apparatus 904 is shown in the illustrated example of FIG. 9. However, it should be understood that substantially the same apparatus 904 is implemented in both of the TOR switches 504*a-b*. The example apparatus 904 is provided in the TOR switches 504*a-b* to synchronize the synchronized MAC address tables 501*a-b* of FIG. 5 between the TOR switches 504*a-b* as described above in connection with FIG. 5, to establish the inter-switch link 507 between the TOR switches 504*a-b*, and to use the synchronized MAC address tables 501*a-b* and the inter-switch link 507 to transmit network packets and BUM packets from the TOR switches 504*a-b* to destination hosts using only LBT active links to substantially reduce or eliminate network flooding and/or duplicate packet delivery. In the example of FIG. 9, the synchronized MAC address tables 501*a-b* are represented by way of example as a synchronized MAC address table 501.

In the illustrated example, the physical rack 902 is a combination of computing hardware and installed software that may be used by a customer to create and/or add to a virtual computing environment for running VMs and/or containers. The physical rack 902 of the illustrated example can include upwards of 24 hosts 508 which include the hosts 508*a-c* of FIGS. 5-8. The example hosts 508*a-c* are in network communication with the TOR switches 504*a-b* to enable network communications between the hosts 508 through the TOR switches 504*a-b*. In some examples, the physical rack 902 is physically connected to an external network 906 via the TOR switches 504*a-b*. In other examples, the TOR switches 504*a-b* are connected to the external network 906 via a spine switch such as the spine switch 502 of FIGS. 5 and 6. In some examples, the spine switch 502 can also be used to interconnect the TOR switches 504*a-b* of the physical rack 902 with other physical racks (e.g., other physical racks in a network environment such as a cloud computing environment).

An example block diagram of the first host H1 508*a* of FIGS. 5-8 is shown in FIG. 9. The second host H2 508*b* and the third host H3 508*c* of FIGS. 5-8 are substantially similar or identical to the first host H1 508*a*. In the illustrated example of FIG. 9, a physical environment 914 and a virtual environment 916 of the host 508*a* are shown in detail as connected to the first TOR switch 504*a* and the second TOR switch 504*b*. The example physical environment 914 includes the hardware-level components of the host 508*a* which may include one or more central processor units (CPUs), one or more memory devices, one or more storage units, one or more graphics processor units (GPUs), one or more pNICs, etc. In the illustrated example, two pNICs 922*a-b* are provided in the host 508*a*. In other examples, more pNICs (e.g., four pNICs) may be provided in the host 508*a*. The pNICs 922*a-b* enable physical network connections between the host 508*a* and the TOR switches 504*a-b*.

In the illustrated example of FIG. 9, the host 508*a* executes an example hypervisor 924, which provides local virtualization services to create the example virtual environment 916 in the host 508*a*. The example hypervisor 924 may be implemented using any suitable hypervisor (e.g., VMWARE® ESX® hypervisor, Microsoft HYPER-V® hypervisor, and Kernel Based Virtual Machine (KVM)). In the illustrated example of FIG. 9, the hypervisor 924 executes one or more VMs (e.g., an example VM 928) and an example virtual network (vnetwork) distributed switch (VDS) 932. The example VDS 932 functions as a single virtual switch that can be deployed in a single host and/or across multiple hosts. This enables setting virtual network configurations that span across all the member hosts of the VDS 932 and allows VMs to maintain consistent virtual network configurations even when any such VM is migrated across the multiple member hosts. In the illustrated example, the VM 928 is configured to include a vNIC 934 (although additional vNICs may be configured) for use by applications executed by the VM 928 to perform network communications via the network 906. The example vNIC 934 is created by running virtualization services that enable the VM 928 to employ the pNICs 922*a-b* of the host 508*a* through the VDS 932 for network communications. In the illustrated example, the first and second pNICs 922*a-b* are allocated as physical resources by the hypervisor 924 for use by the VDS 932 and the VM 928 in providing virtual network resources. For example, the hypervisor 924 instantiates a vNIC 934 as a virtual network interface resource, and the VDS 932 instantiates a dvport 938 through which the vNIC 934 connects to the allocated pNICs 922*a-b*. The example vNIC 934 connects to the TOR switches 504*a-b* via the pNICs 922*a-b*. In the illustrated example, the vNIC 934 connects to the pNICs 922*a-b* through the dvport 938 and the VDS 932 such that the pNICs 922*a-b* are connected to the VDS 932 and exchange network packets with the vNIC 934 via the VDS 932. The example dvport 938 is assigned a port number by the VDS 932 to identify a source/destination side of a connection that terminates at the hypervisor 924. The VDS 932 uses the port number of the dvport 938 to determine the vNIC 934 and the applications to which received network communications should be delivered.

In the illustrated example, since the TOR switches 504a-b implement an LBT load balancing policy in Active-Passive mode in which a dvport can be active on only one pNIC at a time, the dvport 938 connects to the first TOR switch (TOR1) 504a through the first pNIC 922a via an active link (shown by a solid line) and connects to the second TOR switch 504b through the second pNIC 922b via a passive link (shown by a dashed line). The pNIC 922a may be also be allocated to other vNICs. As such, a total utilization of the pNIC 922a is dependent on the cumulative traffic across all of the vNICs that are assigned to the pNIC 922a. As such, in accordance with an LBT policy, when the pNIC 922a reaches greater than 75% utilization of its bandwidth capacity by all of the vNICs assigned to it, the second pNIC 922b is switched from a passive link to an active link for the vNIC 934, and the first pNIC 922a is switched from an active link to a passive link for the vNIC 934.

The example TOR switches 504a-b are shown in a magnified view in FIG. 9 to show egress ports and ingress ports for receiving and transmitting packets between the two TOR switches 504a-b, between the TOR switches 504a-b and host nodes (e.g., the hosts 508a-c of FIGS. 5-8), and between the TOR switches 504a-b and a spine switch (e.g., the spine switch 502 of FIG. 5). In the illustrated example of FIG. 9, egress ports for outgoing packets are identified by a capital letter "E" and some are indicated by reference number 940, and ingress ports for incoming packets are identified by a capital letter "I" and some are indicated by reference number 942. In the illustrated example, when an LBT load balancing policy is implemented in the TOR switches 504a-b, some or all of the egress ports 940 and ingress ports 942 are configured as LBT ports (e.g., LBT egress ports 940 and LBT ingress ports 942) for use in accordance with the LBT load balancing policy. In the illustrated example, the inter-switch link 507 of FIGS. 5-8 is shown as implemented by two LBT links between the TOR switches 504a-b in which a first LBT link is formed between an LBT egress port 940 of the second TOR switch (TOR2) 504b and an LBT ingress port 942 of the first TOR switch (TOR1) 504a, and a second LBT link is formed between an LBT egress port 940 of the first TOR switch (TOR1) 504a and an LBT ingress port 942 of the second TOR switch 504b.

Turning in detail to the apparatus 904 of the illustrated example, the apparatus 904 is provided with an example packet receiver 946, an example packet transmitter 948, an example synchronizer 950, an example packet analyzer 952, and an example network configurator 956. The example apparatus 904 is provided with the packet receiver 946 to receive packets (e.g., the packet 610 of FIG. 6, the packet 710 of FIG. 7, and the packet 810 of FIG. 8). The example apparatus 904 is provided with the packet transmitter 948 to transmit packets.

The example apparatus 904 is provided with the synchronizer 950 to synchronize active link mappings between the synchronized MAC address tables 501a-b (FIG. 5) of the TOR switches 504a-b. For example, a first synchronizer 950 of the first TOR switch (TOR1) 504a can perform a messaging exchange with a second synchronizer 950 of the second TOR switch (TOR2) 504b via the inter-switch link 507 to exchange active link mappings between the synchronized MAC address tables 501a-b. An example messaging exchange may involve the first synchronizer 950 of the first TOR switch (TOR1) 504a sending active link mapping entries from its first synchronized MAC address table 501a in a probe request to the second synchronizer 950 of the second TOR switch (TOR2) 504b, and the second synchronizer 950 of the second TOR switch (TOR2) 504b responding by sending active link mapping entries from its second synchronized MAC address table 501b in a probe response to the first synchronizer 950 of the first TOR switch (TOR1) 504a.

As a further example of the synchronizer 950, and with reference to the inter-switch active link mapping entries 512, 514, 516 of FIG. 5, when the apparatus 904 is implemented in the first TOR switch (TOR1) 504a, the synchronizer 950 synchronizes an active link mapping corresponding to the third host H3 508c from the second synchronized MAC address table 501b and stores the active link mapping as the inter-switch active link mapping entry 512 in the first synchronized MAC address table 501a, as shown in FIG. 5. When the example apparatus 904 is implemented in the second TOR switch (TOR2) 504b, the synchronizer 950 synchronizes active link mappings corresponding to the first host H1 508a and the second host 508b from the first synchronized MAC address table 501a and stores the active link mappings as the inter-switch active link mapping entries 514, 516 in the second synchronized MAC address table 501b, as shown in FIG. 5. The example synchronizer 950 also stores switch descriptors (e.g., "TOR1" or "TOR2" of FIG. 5) in association with inter-switch active link mappings (e.g., the inter-switch active link mapping entries 512, 514, 516 of FIG. 5).

The example synchronizer 950 also determines whether the TOR switches 504a-b are configured to operate using an LBT policy. For example, the synchronizer 950 may submit a configuration query to one or more of the hosts 508a-c to determine whether the hosts 508a-c are operating under an LBT policy. A response from the hosts 508a-c may be as follows when an LBT policy is implemented:
LBT
interface Ethernet 1/6
switchport mode LBT
The above response indicates that a switchport mode of a queried host is configured to operate using an LBT policy.
When a LAG policy is implemented, a response from the hosts 508a-c may be as follows:
LAG
interface Ethernet 1/6
switchport mode LACP
The above response indicates that a switchport mode of a queried host is configured to operate using a LAG policy.

Alternatively, the example synchronizer 950 can determine when an LBT policy is implemented based on receiving a Link Aggregation Control Packet (LACP) from the hosts 508a-c. For example, the hosts 508a-c transmit LACPs as part of implementing LAG policies. As such, receiving an LACP at a TOR switch 504a-b is indicative of a LAG policy being implemented instead of an LBT policy.

When the hosts 308a-c indicate that LBT is implemented, the synchronizer 950 synchronizes active link mapping entries between to TOR switches 504a-b to generate the synchronized MAC address tables 501a-b for use by the apparatus 904 to transmit packets in accordance with hardware-assisted LBT via active links. Alternatively, when a response from the hosts 508a-c indicates that LAG is implemented (instead of LBT), the synchronizer 950 does not synchronize active link mapping entries between the TOR switches 504a-b, and the TOR switches 504a-b operate in accordance with LAG policy.

The example apparatus 904 is provided with the packet analyzer 952 to analyze information in received packets. For example, the packet analyzer 952 may analyze a destination address (e.g., MAC addresses) in a destination address field of an L2 header of a packet to determine whether the TOR switch 504a-b in which the apparatus 904 is implemented knows the network location of the destination node of that packet. In the illustrated example, the packet analyzer 952 compares the destination addresses of packets to MAC addresses of intra-switched active link mappings and inter-switched active link mappings stored in the example synchronized MAC address table 501 (e.g., the synchronized MAC address table 501a-b of FIG. 5). The synchronized MAC address table 501 may be stored in any suitable memory and/or storage device(s) (e.g., the volatile memory 1114, the nonvolatile memory 1116, the mass storage 1128, and/or the local memory 1113 of FIG. 11) of the TOR switch 504a-b.

The example apparatus 904 is provided with the network configurator 956 to establish and/or configure inter-switch links (e.g., the inter-switch link 507) between the TOR switches 504a-b. For example, the network configurator 956 of the first TOR switch (TOR1) 504a configures an LBT egress port 940 of the first TOR switch (TOR1) 504a to enable the LBT egress port 940 for communication with the second TOR switch (TOR2) 504b. In addition, the network configurator 956 of the first TOR switch (TOR1) 504a signals a second network configurator (similar or the same as the network configurator 956) of the second TOR switch (TOR2) 504b to cause the second network configurator of the second TOR switch (TOR2) 504b to configure an LBT ingress port 942 of the second TOR switch (TOR2) 504b corresponding to a link connected to the enabled LBT egress port 940 of the first TOR switch (TOR1) 504a. In this manner, the second network configurator of the second TOR switch (TOR2) 504b enables the LBT ingress port 942 for communication with the first TOR switch (TOR1) 504a so that the inter-switch link 507 is established between the LBT egress port 940 of the first TOR switch (TOR1) 504a and the LBT ingress port 942 of the second TOR switch (TOR2) 504b.

While an example manner of implementing the apparatus 904 is illustrated in FIG. 9, one or more of the elements, processes and/or devices illustrated in FIG. 9 may be combined, divided, re-arranged, omitted, eliminated and/or implemented in any other way. Further, the example packet receiver 946, the example packet transmitter 948, the example synchronizer 950, the example packet analyzer 952, and the example network configurator 956 and/or, more generally, the example apparatus 904 of FIG. 9 may be implemented by hardware, software, firmware and/or any combination of hardware, software and/or firmware. Thus, for example, any of the example packet receiver 946, the example packet transmitter 948, the example synchronizer 950, the example packet analyzer 952, and the example network configurator 956 and/or, more generally, the example apparatus 904 could be implemented by one or more analog or digital circuit(s), logic circuits, programmable processor(s), programmable controller(s), graphics processor unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example packet receiver 946, the example packet transmitter 948, the example synchronizer 950, the example packet analyzer 952, and/or the example network configurator 956 is/are hereby expressly defined to include a non-transitory computer readable storage device or storage disk such as a memory, a digital versatile disk (DVD), a compact disk (CD), a Blu-ray disk, etc. including the software and/or firmware. Further still, the example apparatus 904 of FIG. 9 may include one or more elements, processes and/or devices in addition to, or instead of, those illustrated in FIG. 9, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10:
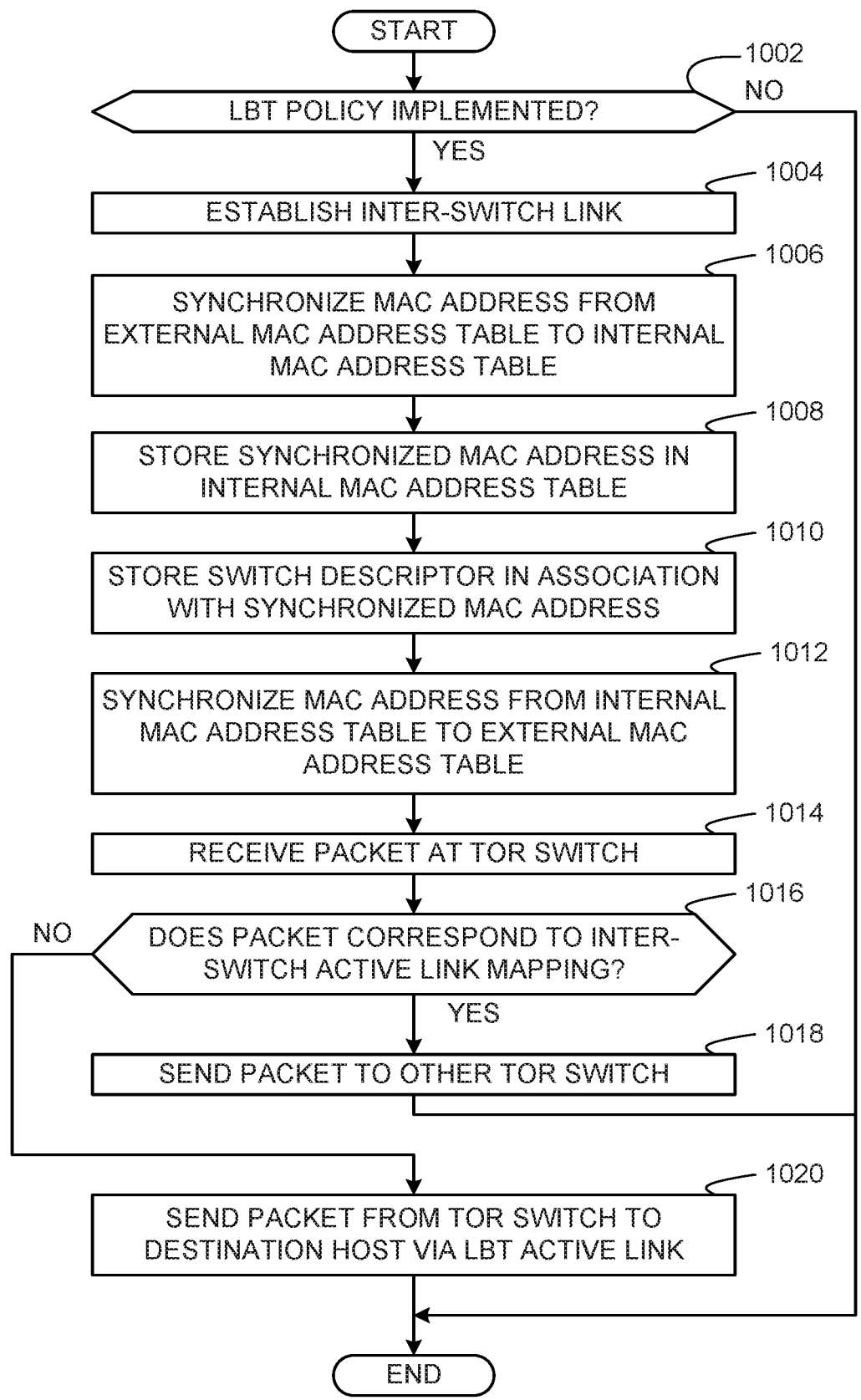
FIG. 10 is a flowchart representative of example machine-readable instructions that may be executed to implement the apparatus of FIG. 9 to substantially reduce or eliminate network flooding and/or duplicate packet delivery when a hardware-assisted LBT policy is employed.

A flowchart representative of example hardware logic, machine readable instructions, hardware implemented state machines, and/or any combination thereof for implementing the apparatus 904 of FIG. 9 is shown in FIG. 10. The machine readable instructions may be one or more executable programs or portion(s) of one or more executable programs for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 10, many other methods of implementing the example apparatus 904 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions disclosed herein may be stored in one or more of a compressed format, an encrypted format, a fragmented format, a packaged format, etc. Machine readable instructions as disclosed herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example process of FIG. 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The example instructions of FIG. 10 may be executed to substantially reduce or eliminate network flooding and/or duplicate packet delivery when a hardware-assisted LBT policy is employed in a multi-fabric virtual network. The example instructions of FIG. 10 are described from the perspective of the second TOR switch (TOR2) 504b. However, the example instructions of FIG. 10 are similarly implementable from the perspective of the first TOR switch (TOR1) 504a and/or any other TOR switch. The program of FIG. 10 includes block 1002 at which the example synchronizer 950 (FIG. 9) determines whether an LBT policy is implemented in a multi-fabric virtual network. For example, the synchronizer 950 may submit a configuration query to one or more of the hosts 508a-c to determine whether the hosts 508a-c are operating under an LBT policy as described above in connection with FIG. 9. Additionally or alternatively, the synchronizer 950 may determine when an LBT policy is implemented based on receiving a LACP from one or more of the hosts 508a-c as described above in connection with FIG. 9. If the synchronizer 950 determines, at block 1002, that an LBT policy is not implemented (e.g., a LAG policy is implemented instead), the process implemented by the example instructions of FIG. 10 ends.

If the synchronizer 950 determines, at block 1002, that an LBT policy is implemented, the example network configurator 956 (FIG. 9) establishes an inter-switch link (block 1004) such as the inter-switch link 507 of FIGS. 5-9. For example, the network configurator 956 of the second TOR switch (TOR2) 504b configures an LBT egress port 940 (FIG. 9) of the second TOR switch (TOR2) 504b to enable the LBT egress port 940 for communication with the first TOR switch (TOR1) 504a. In addition, the network configurator 956 of the second TOR switch (TOR2) 504b signals a second network configurator (similar or the same as the network configurator 956) of the first TOR switch (TOR1) 504a to cause the second network configurator of the first TOR switch (TOR1) 504a to configure an LBT ingress port 942 of the first TOR switch (TOR1) 504a corresponding to a link connected to the enabled LBT egress port 940 of the second TOR switch (TOR2) 504b. In this manner, the second network configurator of the first TOR switch (TOR1) 504a enables the LBT ingress port 942 for communication with the second TOR switch (TOR2) 504b so that the inter-switch link 507 is established between the LBT egress port 940 of the first TOR switch (TOR1) 504a and the LBT ingress port 942 of the second TOR switch (TOR2) 504b.

The example synchronizer 950 synchronizes a MAC address from an external MAC address table to an internal MAC address table (block 1006). For example, the synchronizer 950 at the second TOR switch (TOR2) 504b synchronizes a MAC address from the first synchronized MAC address table 501a (FIG. 5) of the first TOR switch (TOR1) 504a (FIG. 5) employing an LBT network configuration to the second synchronized MAC address table 502a (FIG. 5) of the second TOR switch (TOR2) 504b of the LBT network configuration. In this example, the MAC address (e.g., 00:11:22:33:44:55, as shown in FIG. 5) corresponds to the pNIC 922a (FIG. 9) of the first host H1 508a (FIG. 5), and the pNIC 922a forms an active link between the first host H1 508a and the first TOR switch (TOR1) 504a. In the synchronization of block 1006, the first synchronized MAC address table 501a is an external MAC address table relative to the second TOR switch (TOR2) 504b, and the second synchronized MAC address table 501*b* is an internal MAC address table relative to the second TOR switch (TOR2) 504*b*.

The example synchronizer 950 stores the synchronized MAC address in the internal MAC address table (block 1008). For example, the synchronizer 950 stores the MAC address synchronized at block 1006 in the inter-switch active link mapping entry 514 (FIG. 5) in the second synchronized MAC address table 501*b* of the second TOR switch (TOR2) 504*b* in association with a port number of the first TOR switch (TOR1) 504*a*. The example synchronizer 950 stores a switch descriptor in association with the synchronized MAC address (block 1010). For example, the synchronizer 950 stores the switch descriptor "TOR1" in association with the synchronized MAC address 00:11:22:33:44:55 of the first host H1 508*a* (FIG. 5) in the second synchronized MAC address table 501*b* of the second TOR switch (TOR2) 504*b* as shown in the inter-switch active link mapping entry 514 of FIG. 5. The example switch descriptor "TOR1" is indicative of the first TOR switch (TOR1) 504*a* maintaining an active link with the first host H1 508*a* corresponding to the MAC address 00:11:22:33:44:55.

In the illustrated example of FIG. 10, the synchronizer 950 also synchronizes a MAC address from the internal MAC address table to the external MAC address table (block 1012). For example, the synchronizer 950 at the second TOR switch (TOR2) 504*b* synchronizes the MAC address 00:11:22:33:44:66 corresponding to the third host H3 508*c*, as shown in FIG. 5, from the second synchronized MAC address table 501*b* of the second TOR switch (TOR2) 504*b* to the first synchronized MAC address table 501*a* of the first TOR switch (TOR1) 504*a*. In this manner, the first TOR switch (TOR1) 504*a* can store the MAC address 00:11:22:33:44:66 in the example inter-switch active link mapping entry 512 (FIG. 5) in the first synchronized MAC address table 501*a* in association with a switch descriptor "TOR2" indicative of the second TOR switch (TOR2) 504*b*, as shown in FIG. 5.

The example packet receiver 946 (FIG. 9) receives a packet at the second TOR switch (TOR2) 504*b* (block 1014). For example, the packet receiver 946 receives, at the second TOR switch (TOR2) 504*b*, a network packet to be delivered to the first host H1 508*a*. In some examples, the network packet is to be delivered to the first host H1 508*a* based on the network packet including the MAC address of the first host H1 508*a* as a destination address. In other examples, a network packet is to be delivered to the first host H1 508*a* based on the network packet being a BUM packet that is to be delivered to multiple destination hosts.

The example packet analyzer 952 (FIG. 9) determines whether the packet corresponds to an inter-switch active link mapping of the internal MAC address table (block 1016). For example, the packet analyzer 952 determines whether the network packet received at bock 1014 corresponds to either of the inter-switch active link mapping entries 514, 516 (FIG. 5) in the second synchronized MAC address table 501*b* of the second TOR switch (TOR2) 504*b*. In some examples, the network packet corresponds to an inter-switch active link mapping entry when the network packet includes a destination address matching a MAC address of the inter-switch active link mapping entry. In other examples, the network packet corresponds to an inter-switch active link mapping entry when the network packet is a BUM packet to be delivered to multiple destination hosts including hosts corresponding to inter-switch active link mapping entries.

If the packet analyzer 952 determines, at block 1018, that the packet corresponds to an inter-switch active link mapping of the internal MAC address table, the example packet transmitter 948 (FIG. 9) sends the packet to another TOR switch (block 1018). For example, when the network packet is destined to the first host H1 508*a*, the packet transmitter 948 sends the network packet from the second TOR switch (TOR2) 504*b* to the first TOR switch (TOR1) 504*a* via the inter-switch link 507 (FIGS. 5-9) based on the switch descriptor "TOR1" stored in association with the MAC address 00:11:22:33:44:55 of the first host H1 508*a*, which is stored in the inter-switch active link mapping entry 514 in the second synchronized MAC address table 501*b*. In the example of block 1018, the packet transmitter 948 sends the network packet from the second TOR switch (TOR2) 504*b* to the first TOR switch (TOR1) 504*a* based on a hardware-assisted LBT policy without using a virtual network layer to determine where to forward the network packet from the second TOR switch (TOR2) 504*b*. That is, the packet transmitter 948 sends the network packet from the second TOR switch (TOR2) 504*b* to the first TOR switch (TOR1) 504*a* without sending the network packet from the second TOR switch (TOR2) 504*b* to the first host H1 508*a* corresponding to the inter-switch active link mapping entry 514 of FIG. 5. The is based on the packet analyzer 952 recognizing, based on the inter-switch active link mapping entry 514, that the first TOR switch (TOR1) 504*a* maintains an active link with the first host H1 508*a* and, as such, the first TOR switch (TOR1) 504*a* will deliver the network packet to the first host H1 508*a*. In this manner, by refraining from forwarding the network packet to hosts without active links with the second TOR switch (TOR2) 504*b*, the second TOR switch (TOR2) 504*b* does not flood the network with the network packet or cause duplicate packet delivery of multi-destination packets. The process implemented by the example instructions of FIG. 10 then ends.

Returning to block 1018, if the packet analyzer 952 determines that the packet does not correspond to an inter-switch active link mapping of the internal MAC address table, the example packet transmitter 948 sends the packet from the second TOR switch (TOR2) 504*b* to the destination host via an LBT active link (block 1020). For example, if the network packet is a unicast packet destined to a particular host, the second TOR switch (TOR2) 504*b* can transmit the network packet on an active link with a host based on a destination host MAC address of the network packet matching a MAC address stored in an intra-switch active link mapping entry of the second synchronized MAC address table 501*b*. Alternatively, if the network packet is a BUM packet, the second TOR switch (TOR2) 504*b* can transmit the network packet only to hosts for which MAC addresses are stored in intra-switch active link mapping entries in the second synchronized MAC address table 501*b* without broadcasting the network packet via passive links. In this manner, the BUM packet does not result in duplicate multi-destination packet delivery to hosts. The example process of FIG. 10 then ends.

Although the example instructions of FIG. 10 are shown as ending, multiple iterations of the example instructions may be performed for any duration of operation of the TOR switches 504*a-b*. In this manner, the example instructions of FIG. 10 may be used to forward multiple network packets including unicast packets destined to particular destination hosts, and/or multi-destination packets such as BUM packets destined to multiple destination hosts. For example, during one or more iterations of the instructions of FIG. 10, for one or more packets destined to the first host H1 508*a*, the packet transmitter 948 may send the one or more packets from the second TOR switch (TOR2) 504*b* to the first TOR switch (TOR1) 504*a*, without sending the one or more packets from the second TOR switch (TOR2) 504*b* to the first host H1 508*a*. This example is based on the switch descriptor "TOR1" being stored in the second synchronized MAC address table 501*b* in association with the MAC address 00:11:22:33:44:55 of the first host H1 508*a*, as shown in FIG. 5. As a further example, during one or more other iterations of the instructions of FIG. 10, for one or more packets destined to the third host H3 508*c*, the packet transmitter 948 is further to send the one or more packets from the second TOR switch (TOR2) 504*b* to the third host H3 508*c* without sending the second one or more packets from the second TOR switch (TOR2) 504*b* to the first TOR switch (TOR1) 504*a* or from the second TOR switch (TOR2) 504*b* to the spine switch 502 (FIG. 5). This further example is based on the second synchronized MAC address table 501*b* storing an intra-switch active link mapping entry showing that the second TOR switch (TOR2) 504*b* maintains an active link directly with the third host H3 508*c* via port number 10, as shown in FIG. 5.

Figure 11:
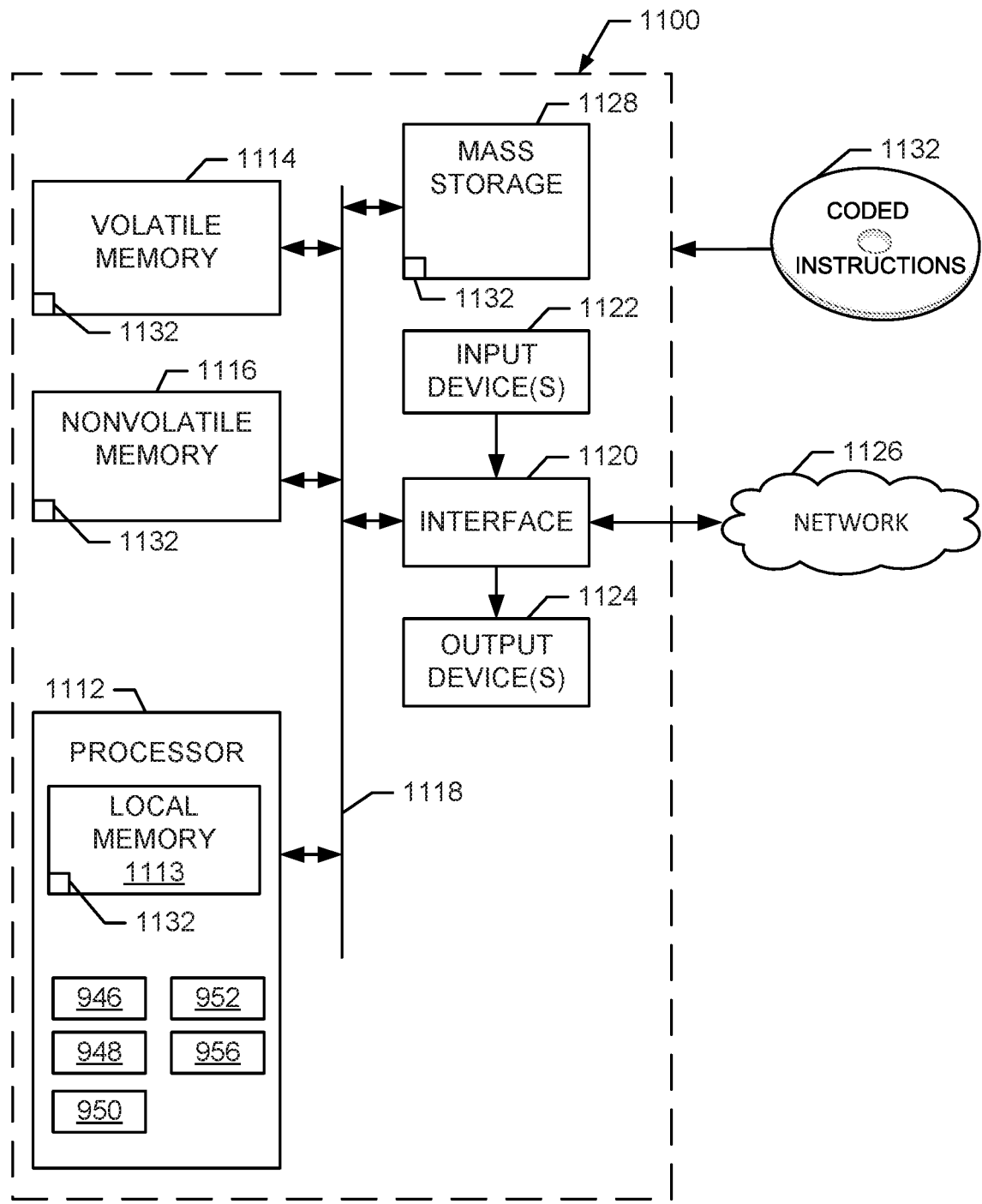
FIG. 11 is a block diagram of an example processor platform structured to execute the machine-readable instructions represented in FIG. 10 to implement the apparatus of FIG. 9 to substantially reduce or eliminate network flooding and/or duplicate packet delivery when a hardware-assisted LBT policy is employed.

FIG. 11 is a block diagram of an example processor platform 1100 structured to execute the instructions of FIG. 10 to implement the apparatus 904 of FIG. 9 to substantially reduce or eliminate network flooding and/or duplicate packet delivery when a hardware-assisted LBT policy is employed. The processor platform 1100 can be, for example, a server, a personal computer, a workstation, a self-learning machine (e.g., a neural network), or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor 1112 may be a semiconductor based (e.g., silicon based) device. In this example, the processor implements the example packet receiver 946, the example packet transmitter 948, the example synchronizer 950, the example packet analyzer 952, and the example network configurator 956 of FIG. 9.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

Machine executable instructions 1132 represented by the flowchart of FIG. 10 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus and articles of manufacture have been disclosed that use synchronized MAC address tables in TOR switches to substantially reduce or eliminate network flooding and/or duplicate packet delivery when a hardware-assisted LBT policy is employed in a network communication system including a multi-fabric virtual network. The disclosed methods, apparatus and articles of manufacture improve the efficiency of network switches (e.g., TOR switches) and hosts by substantially reducing the overuse of network resources, memory resources, and processor resources that are otherwise needed to process significantly large amounts of packets involved in network flooding of unicast packets and duplicate packet delivery of multi-destination packets. That is, by substantially reducing or eliminating network flooding and/or duplicate packet delivery when a hardware-assisted LBT policy is employed in a network communication system, examples disclosed herein reduce the number of packets that are transmitted between network switches and nodes. In turn, those network switches and nodes process fewer packets while still achieving successful packet delivery to destination hosts. In this manner, examples disclosed herein can be used to decrease network congestion and, thus, increase network throughput and speed for faster network communications. In addition, processing of fewer packets based on examples disclosed herein enables network switches and hosts to maintain network resources, memory resources, and processing resources idle for longer durations. In some examples, such processing of fewer packets can be used to advantageously place network resources, memory resources, and/or processing resources in low-power modes for longer durations, thus, contributing to lower power consumption by those resources. In the same or other examples, processing of fewer packets can be used to advantageously re-allocate network resources, memory resources, and/or processing resources to other tasks, thus improving performance for such other tasks. The disclosed methods, apparatus and articles of manufacture are accordingly directed to one or more improvement(s) in the functioning of a computer.

Examples disclosed herein may be used with one or more different types of virtualization environments. Three example types of virtualization environments are: full virtualization, paravirtualization, and OS virtualization. Full virtualization, as used herein, is a virtualization environment in which hardware resources are managed by a hypervisor to provide virtual hardware resources to a VM. In a full virtualization environment, the VMs do not have access to the underlying hardware resources. In a typical full virtualization, a host OS with embedded hypervisor (e.g., a VMWARE® ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical RAM with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource). In a typical paravirtualization system, a host OS (e.g., a Linux-based OS) is installed on the server hardware. A hypervisor (e.g., the XEN® hypervisor) executes on the host OS. VMs including virtual hardware resources are then deployed on the hypervisor. The hypervisor manages the association between the hardware resources of the server hardware and the virtual resources allocated to the VMs (e.g., associating RAM with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) may include multiple different virtualization environments. For example, a data center may include hardware resources that are managed by a full virtualization environment, a paravirtualization environment, and/or an OS virtualization environment. In such a data center, a workload may be deployed to any of the virtualization environments. Examples disclosed herein may be implemented in any one or more of the multiple different virtualization environments.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to synchronize active link information across top-of-rack (TOR) switches in a load-based teaming (LBT) network configuration, the apparatus comprising:
a synchronizer to:
synchronize a first media access control (MAC) address from a first MAC address table of a first TOR switch of the LBT network configuration to a second MAC address table of a second TOR switch of the LBT network configuration, the first MAC address corresponding to a first network interface card (NIC) of a first host, the first NIC to form a first active link between the first host and the first TOR switch, and
store a first switch descriptor in association with the first MAC address in the second MAC address table, the first switch descriptor indicative of the first TOR switch; and
a packet transmitter to, for a first packet to be delivered to the first host, send the first packet from the second TOR switch to the first TOR switch, without sending the first packet from the second TOR switch to the first host, based on the first switch descriptor stored in association with the first MAC address in the second MAC address table.

2. The apparatus of claim 1, further including a packet receiver to receive the first packet from a source host or a spine switch before the packet transmitter is to send the first packet from the second TOR switch to the first TOR switch.

3. The apparatus of claim 1, wherein a passive link is between the second TOR switch and the first host, and wherein the packet transmitter is to send the first packet from the second TOR switch to the first TOR switch without sending the first packet from the second TOR switch to the first host by not transmitting the first packet from the second TOR switch via the passive link.

4. The apparatus of claim 1, wherein the synchronizer is to synchronize a second MAC address from the second MAC address table of the second TOR switch to the first MAC address table of the first TOR switch, the second MAC address corresponding to a second NIC of a second host connected to the second TOR switch via a second active link.

5. The apparatus of claim 4, wherein a first passive link is between the second TOR switch and the first host, and a second passive link is between the first TOR switch and the second host.

6. The apparatus of claim 4, wherein the packet transmitter is further to, for a second packet to be delivered to the second host, send the second packet from the second TOR switch to the second host without sending the second packet from the second TOR switch to the first TOR switch and without sending the second packet from the second TOR switch to a spine switch.

7. The apparatus of claim 1, wherein the packet transmitter is to send the first packet from the second TOR switch to the first TOR switch based on a hardware-assisted LBT policy without using a virtual network layer to determine a forwarding of the first packet from the second TOR switch.

8. The apparatus of claim 1, wherein the packet transmitter is to send the first packet from the second TOR switch to the first TOR switch via an inter-switch link between the first and second TOR switches.

9. A non-transitory computer readable storage medium comprising instructions that, when executed by one or more processors, cause the one or more processors to at least:
synchronize a first media access control (MAC) address from a first MAC address table of a first TOR switch of a load-based teaming (LBT) network configuration to a second MAC address table of a second TOR switch of the LBT network configuration, the first MAC address corresponding to a first network interface card (NIC) of a first host, the first NIC to be in a first active link between the first host and the first TOR switch;
store a first switch descriptor in association with the first MAC address in the second MAC address table, the first switch descriptor to identify the first TOR switch; and
for a first packet to be delivered to the first host, cause the second TOR switch to send the first packet to the first TOR switch, without sending the first packet from the second TOR switch to the first host, based on the first switch descriptor.

10. The non-transitory computer readable storage medium of claim 9, wherein the instructions are to cause the one or more processors to access the first packet from a source host or a spine switch before the second TOR switch is to send the first packet to the first TOR switch.

11. The non-transitory computer readable storage medium of claim 9, wherein a passive link is between the second TOR switch and the first host, and the instructions are to cause the one or more processors to not send the first packet from the second TOR switch to the first host by not transmitting the first packet from the second TOR switch via the passive link.

12. The non-transitory computer readable storage medium of claim 9, wherein the instructions are further to cause the one or more processors to synchronize a second MAC address from the second MAC address table of the second TOR switch to the first MAC address table of the first TOR switch, the second MAC address corresponding to a second NIC of a second host associated with the second TOR switch via a second active link.

13. The non-transitory computer readable storage medium of claim 12, wherein the instructions are further to cause the one or more processors to, for a second packet to be delivered to the second host, cause the second TOR switch to send the second packet to the second host without causing the second TOR switch to send the second packet from the second TOR switch to the first TOR switch and without causing the second TOR switch to send the second packet from the second TOR switch to a spine switch.

14. The non-transitory computer readable storage medium of claim 9, wherein the instructions are to cause the one or more processors to cause the second TOR switch to send the first packet to the first TOR switch based on a hardware-assisted LBT policy without using a virtual network layer to determine a forwarding of the first packet from the second TOR switch.

15. The non-transitory computer readable storage medium of claim 9, wherein the instructions are to cause the one or more processors to cause the second TOR switch to send the first packet to the first TOR switch via an inter-switch link between the first and second TOR switches.

16. A method to synchronize active link information across top-of-rack (TOR) switches in a load-based teaming (LBT) network configuration, the method comprising:
synchronizing, by executing an instruction with one or more processors, a first media access control (MAC) address from a first MAC address table of a first TOR switch of the LBT network configuration to a second MAC address table of a second TOR switch of the LBT network configuration, the first MAC address corresponding to a first network interface card (NIC) of a first host, the first NIC forming a first active link between the first host and the first TOR switch;
storing, by executing an instruction with the one or more processors, a first switch descriptor in association with the first MAC address in the second MAC address table, the first switch descriptor indicative of the first TOR switch; and
for a first packet to be delivered to the first host, sending, by executing an instruction with the one or more processors, the first packet from the second TOR switch to the first TOR switch, without sending the first packet from the second TOR switch to the first host, based on the first switch descriptor.

17. The method of claim 16, further including accessing the first packet from a source host or a spine switch before the sending of the first packet from the second TOR switch to the first TOR switch.

18. The method of claim 16, wherein a passive link is between the second TOR switch and the first host, and wherein the sending of the first packet from the second TOR switch to the first TOR switch, without the sending of the first packet from the second TOR switch to the first host includes not transmitting the first packet from the second TOR switch via the passive link.

19. The method of claim 16, further including synchronizing a second MAC address from the second MAC address table of the second TOR switch to the first MAC address table of the first TOR switch, the second MAC address corresponding to a second NIC of a second host associated with the second TOR switch via a second active link.

20. The method of claim 19, further including, for a second packet to be delivered to the second host, sending the second packet from the second TOR switch to the second host without sending the second packet from the second TOR switch to the first TOR switch and without sending the second packet from the second TOR switch to a spine switch.

21. The method of claim 16, wherein the sending of the first packet from the second TOR switch to the first TOR switch is based on a hardware-assisted LBT policy without using a virtual network layer to determine a forwarding of the first packet from the second TOR switch.

22. The method of claim 16, wherein the sending of the first packet from the second TOR switch to the first TOR switch is via an inter-switch link between the first and second TOR switches.

\* \* \* \* \*